US010042586B2

(12) United States Patent
Mylly

(10) Patent No.: US 10,042,586 B2
(45) Date of Patent: Aug. 7, 2018

(54) MANAGING OPERATIONAL STATE DATA IN MEMORY MODULE

(71) Applicant: Memory Technologies LLC, Las Vegas, NV (US)

(72) Inventor: Kimmo J. Mylly, Ylojarvi (FI)

(73) Assignee: Memory Technologies LLC, Las Vegas, NV (US)

(*) Notice: Subject to any disclaimer, the term of this patent is extended or adjusted under 35 U.S.C. 154(b) by 61 days.

(21) Appl. No.: 15/085,815

(22) Filed: Mar. 30, 2016

(65) Prior Publication Data

US 2016/0246546 A1 Aug. 25, 2016

Related U.S. Application Data

(63) Continuation of application No. 13/451,951, filed on Apr. 20, 2012, now Pat. No. 9,311,226.

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0679* (2013.01); *G06F 12/0223* (2013.01); *G06F 12/0246* (2013.01); *G06F 2212/1041* (2013.01); *G06F 2212/7203* (2013.01); *G06F 2212/7207* (2013.01); *Y02D 10/13* (2018.01)

(58) Field of Classification Search
CPC .... G06F 3/0659; G06F 3/0604; G06F 3/0679; G06F 12/0223; G06F 12/0246
See application file for complete search history.

(56) References Cited

U.S. PATENT DOCUMENTS 5,586,291 A 12/1996 Lasker et al.
5,701,516 A 12/1997 Cheng et al.
5,802,069 A * 9/1998 Coulson ................ G06F 3/0601 714/6.13

(Continued)

FOREIGN PATENT DOCUMENTS

AU 2005200855 9/2004
CN 1762025 4/2006

(Continued)

OTHER PUBLICATIONS

Translated Japanese Office Action dated Jun. 30, 2016 for Japanese Patent Application No. 2015-099731, a counterpart foreign application of U.S. Pat. No. 8,307,180, 9 pages.

(Continued)

*Primary Examiner* — Ryan Bertram
(74) *Attorney, Agent, or Firm* — Lee & Hayes, PLLC

(57) ABSTRACT

The specification and drawings present a new apparatus and method for managing/configuring by the memory module controller storing operational state data for operating the memory module controller into an extended random access memory comprised in a memory module and in a host system memory of a host device during various operational modes/conditions of the memory module and the host system memory. Essentially, the memory module controller operated as a master for the data transfers as described herein. The operational state data typically comprises state information, a logical to physical (L2P) mapping table and register settings.

21 Claims, 11 Drawing Sheets

(56) References Cited

U.S. PATENT DOCUMENTS 5,809,340 A 9/1998 Bertone et al.
5,924,097 A 7/1999 Hill
6,067,300 A 5/2000 Baumert et al.
6,115,785 A 9/2000 Estakhri et al.
6,480,936 B1 11/2002 Ban et al.
6,513,094 B1 1/2003 Magro
6,522,586 B2 2/2003 Wong
6,526,472 B2 2/2003 Suzuki
6,665,747 B1 12/2003 Nazari
6,785,764 B1 8/2004 Roohparvar
7,480,749 B1 1/2009 Danilak
7,571,295 B2 8/2009 Sakarda et al.
7,697,311 B2 4/2010 Fukuda et al.
7,809,962 B2 10/2010 Chang et al.
8,307,180 B2 11/2012 Hyvonen et al.
8,321,713 B2 11/2012 Nobunaga
8,514,621 B2 8/2013 Choi et al.
8,826,051 B2 9/2014 Wakrat et al.
9,417,998 B2 8/2016 Mylly et al.
9,841,911 B2 12/2017 Yu et al.
2002/0087817 A1 7/2002 Tomaiuolo et al.
2002/0093913 A1 7/2002 Brown et al.
2002/0108014 A1 8/2002 Lasser
2003/0028737 A1 2/2003 Kaiya et al.
2003/0137860 A1 7/2003 Khatri et al.
2004/0010671 A1 1/2004 Sampsa et al.
2004/0049692 A1 3/2004 Okamoto
2004/0221124 A1 11/2004 Beckert et al.
2004/0230317 A1 11/2004 Kumar et al.
2005/0071570 A1 3/2005 Takasugl et al.
2005/0097280 A1 5/2005 Hofstee et al.
2005/0204113 A1 9/2005 Harper et al.
2006/0041888 A1 2/2006 Radulescu et al.
2006/0069899 A1 3/2006 Schoinas et al.
2006/0075147 A1 4/2006 Schoinas et al.
2006/0075395 A1 4/2006 Lee et al.
2006/0174056 A1 8/2006 Lambert et al.
2006/0179212 A1 8/2006 Kim et al.
2006/0184758 A1 8/2006 Satori et al.
2006/0224789 A1 10/2006 Cho et al.
2006/0280077 A1 12/2006 Suwa
2007/0088867 A1 4/2007 Cho et al.
2007/0207854 A1 9/2007 Wolf et al.
2007/0234006 A1 10/2007 Radulescu et al.
2007/0283078 A1 12/2007 Li et al.
2008/0080688 A1 4/2008 Burgan et al.
2008/0104291 A1 5/2008 Hinchey
2008/0126857 A1* 5/2008 Basham .............. G06F 11/3466 714/25
2008/0162792 A1 7/2008 Wu et al.
2008/0183954 A1 7/2008 Lee et al.
2008/0189485 A1* 8/2008 Jung .................. G06F 12/0246 711/115
2008/0228984 A1 9/2008 Yu et al.
2008/0244173 A1 10/2008 Takai
2008/0281944 A1 11/2008 Vorne et al.
2008/0282030 A1 11/2008 Kalwitz et al.
2008/0320211 A1 12/2008 Kinoshita
2009/0157950 A1 6/2009 Selinger
2009/0164705 A1 6/2009 Gorobets
2009/0182962 A1* 7/2009 Khmelnitsky ...... G06F 13/4239 711/162
2009/0198871 A1 8/2009 Tzeng
2009/0198872 A1 8/2009 Tzeng
2009/0210615 A1 8/2009 Struk et al.
2009/0216937 A1 8/2009 Yasufuku
2009/0313420 A1* 12/2009 Wiesz ................ G06F 12/0246 711/103
2009/0327584 A1 12/2009 Tetrick et al.
2010/0030961 A9 2/2010 Ma et al.
2010/0037012 A1 2/2010 Yano et al.
2010/0100648 A1 4/2010 Madukkarumukumana et al.
2010/0106886 A1 4/2010 Marcu et al.
2010/0115193 A1 5/2010 Manus et al.
2010/0161882 A1 6/2010 Stern et al.
2010/0169558 A1 7/2010 Honda et al.
2010/0169604 A1 7/2010 Trika et al.
2010/0250836 A1* 9/2010 Sokolov .............. G06F 12/0246 711/103
2010/0268928 A1 10/2010 Wang et al.
2010/0293420 A1 11/2010 Kapil et al.
2010/0312947 A1* 12/2010 Luukkainen ........ G06F 12/0223 711/103
2011/0029808 A1 2/2011 Moshayedi
2011/0087804 A1 4/2011 Okaue et al.
2011/0099326 A1 4/2011 Jung et al.
2011/0145537 A1 6/2011 Feldman et al.
2011/0208914 A1 8/2011 Winokur et al.
2011/0296088 A1* 12/2011 Duzly ................ G06F 12/0246 711/103
2012/0023303 A1 1/2012 Russo et al.
2012/0079171 A1 3/2012 Ju et al.
2012/0131263 A1 5/2012 Yeh
2012/0151118 A1 6/2012 Flynn et al.
2012/0239990 A1 9/2012 Mataya et al.
2012/0324299 A1 12/2012 Moshayedi
2013/0007348 A1 1/2013 Fai et al.
2013/0138840 A1 5/2013 Kegel et al.
2013/0145055 A1 6/2013 Kegel et al.
2013/0282957 A1* 10/2013 Mylly ................ G06F 12/0223 711/103
2013/0332691 A1 12/2013 Hyvonen et al.
2013/0339635 A1 12/2013 Amit et al.
2013/0346668 A1 12/2013 Floman et al.
2014/0188719 A1 7/2014 Poornachandran et al.
2015/0039819 A1 2/2015 Luukkainen et al.
2015/0134871 A1 5/2015 Benisty et al.
2015/0160863 A1 6/2015 Mylly
2015/0269094 A1 9/2015 Hyvonen et al.
2016/0062659 A1 3/2016 Floman et al.
2016/0077963 A1 3/2016 Luukkainen et al.
2016/0357436 A1 12/2016 Hyvonen et al.
2017/0038975 A1 2/2017 Mylly et al.
2017/0046067 A1 2/2017 Luukkainen et al.

FOREIGN PATENT DOCUMENTS

CN 101329654 12/2008
CN 101887350 11/2010
CN 101937318 1/2011
CN 101952808 1/2011
EP 0481716 4/1992
EP 1091283 4/2001
EP 1094392 A1 4/2001
EP 1763036 3/2007
JP 59135563 8/1984
JP 0268671 3/1990
JP H02068671 3/1990
JP H11259357 9/1990
JP 06124596 5/1994
JP H06236681 8/1994
JP 10228413 8/1998
JP H10240607 9/1998
JP 11143643 5/1999
JP 2000003309 1/2000
JP 2000057039 2/2000
JP 2000067584 3/2000
JP 2002108691 4/2002
JP 2002259322 9/2002
JP 2002351741 12/2002
JP 2003015949 1/2003
JP 2003150445 5/2003
JP 2004021669 1/2004
JP 2006011818 1/2006
JP 2006195569 7/2006
JP 2006221627 8/2006
JP 2006520958 9/2006
JP 2007079724 3/2007
JP 2007115382 5/2007
JP 2007518166 7/2007
JP 2007220210 8/2007
JP 2011022657 2/2011
JP 2011028537 2/2011

(56) References Cited

FOREIGN PATENT DOCUMENTS

| | | |
|---|---|---|
| JP | 2011039849 | 2/2011 |
| JP | 2011086064 | 4/2011 |
| JP | 2011238175 | 11/2011 |
| JP | 2013109419 | 6/2013 |
| TW | 200701233 | 1/2007 |
| TW | 201135746 | 10/2011 |
| TW | 201209831 | 3/2012 |
| TW | 201214446 | 4/2012 |
| WO | WO2004084231 | 9/2004 |
| WO | WO2005088468 | 6/2005 |
| WO | WO2005066773 A1 | 7/2005 |
| WO | WO2012021380 | 2/2012 |

OTHER PUBLICATIONS

Office action for U.S. Appl. No. 14/945,757, dated Jul. 28, 2016, Luukkainen et al., "Apparatus and Method to Share Host System RAM with Mass Storage Memory RAM", 5 pages.
Office action forOffice action for U.S. Appl. No. 14/566,547, dated Nov. 4, 2016, Mylly, "Unified Memory Type Aware Storage Module", 14 pages.
The Taiwanese Office Action dated Oct. 6, 2016 for Taiwanese Patent Application No. 102114073, a counterpart foreign application of U.S. Pat. No. 9,311,226, 6 pgs.
The Japanese Office Action dated Dec. 20, 2016 for Japanese Patent Application No. 2014-553773, a counterpart foreign application of U.S. Pat. No. 9,417,998.
The Chinese Office Action dated Apr. 21, 2017 for Chinese Patent Application No. 201510093389.3, a counterpart foreign application of U.S. Pat. No. 8,307,180, 6 pgs.
Translated Japanese Office Action dated Apr. 21, 2017 for Japanese patent application No. 2015-099731, a counterpart foreign application of U.S. Pat. No. 8,307,180, 6 pages.
Office Action for U.S. Appl. No. 15/335,688, dated Mar. 24, 2017, Olli Luukkainen, "Apparatus and Method to Share Host System RAM with Mass Storage Memory RAM", 5 pages.
Translated Chinese Office Action dated Mar. 28, 2016 for Chinese Patent Application No. 201380006769.8, a counterpart foreign application of U.S. Appl. No. 13/358,806, 36 pages.
The Chinese Office Action dated Apr. 1, 2016 for Chinese Patent Application No. 201310136995.X, a counterpart foreign application of U.S. Appl. No. 13/451,951, 8 pages.
"PCI Local Bus Specification Revision 3.0", PCI-SGI, Feb. 3, 2004, 344 pages, pp. 238-246.
U.S. Appl. No. 13/358,806, filed Jan. 26, 2012, Mylly, et al., "Apparatus and Method to Provide Cache Move with Non-Volatile Mass Memory System", 45 pgs.
The Chinese Office Action dated Dec. 19, 2013 for Chinese patent application No. 200980106241.1, a counterpart foreign application of U.S. Pat. No. 8,307,180, 4 pages.
The Chinese Office Action dated Apr. 9, 2013 for Chinese patent application No. 200980106241.1, a counterpart foreign application of U.S. Pat. No. 8,307,180, 5 pages.
Translated Chinese Office Action dated Jul. 17, 2015 for Chinese patent application No. 201310136995.X, a counterpart foreign application of U.S. Appl. No. 13/451,951, 28 pages.
Translated Chinese Office Action dated Aug. 27, 2014 for Chinese patent application No. 200980106241.1, a counterpart foreign application of U.S. Pat. No. 8,307,180, 4 pages.
European Search Report for Application No. 09715221.9, dated Oct. 25, 2011, 30 pages.
The Extended European Search Report dated Aug. 31, 2015 for European patent application No. 13741595.6, a counterpart foreign application of U.S. Appl. No. 13/358,806, 8 pages.
JEDEC Standard, "Embedded MultiMediaCard (eMMC) Product Standard, High Capacity," JESD84-A42, Jun. 2007, 29 pages.
JEDEC Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.
JEDEC Standard, "Embedded MultiMediaCard (eMMC) Mechanical Standard," JESD84-C43, Jun. 2007, 13 pages.
Translated Japanese Office Action dated Jan. 16, 2013 for Japanese patent application No. 2010548134, a counterpart foreign application of U.S. Pat. No. 8,307,180, 6 pages.
Translated Japanese Office Action dated Jan. 7, 2015 for Japanese patent application No. 2013-103695, a counterpart foreign application of U.S. Pat. No. 8,307,180, 8 pages.
Translated Japanese Office Action dated Nov. 25, 2013 for Japanese patent application No. 2013-103695, a counterpart foreign application of U.S. Pat. No. 8,307,180, 8 pages.
Translated Japanese Office Action dated Dec. 14, 2015 for Japanese patent application No. 2013-103695, a counterpart foreign application of U.S. Pat. No. 8,307,180, 4 pages.
The Japanese Office Action dated Aug. 27, 2013 for Japanese patent application No. 2010548134, a counterpart foreign application of U.S. Pat. No. 8,307,180, 5 pages.
Japanese Search Report for Application No. 2010-548134, dated May 10, 2012, 11 pages.
Translated Korean Office Action dated Mar. 3, 2014 for Korean patent application No. 2013-7002338, a counterpart foreign application of U.S. Pat. No. 8,307,180, 5 pages.
Translated Office Action for Korean Patent Application No. 10-2010-7021534, dated Sep. 30, 2011, 5 pages.
Lin et al., "A NAND Flash Memory Controller for SD/MMC Flash Memory Card," IEEE Transactions on Magnetics, vol. 43, No. 2, Feb. 2007, pp. 933-935.
Mylly, et al., "Apparatus and Method to Provide Cache Move with Non-Volatile Mass Memory System", U.S. Appl. No. 13/358,806, filed Jan. 26, 2012, 45 pages.
Numonyz, "How to boot an embedded system from an eMMC equipped with a Microsoft FAT file system", Application note AN2539, Nov. 2008, pp. 1-25.
Final Office Action for U.S. Appl. No. 13/527,745, dated Jan. 16, 2015, Matti Floman, "Virtual Memory Module", 22 pages.
Office action for U.S. Appl. No. 14/945,757, dated Jan. 21, 2016, Luukkainen et al., "Apparatus and Method to Share Host System RAM with Mass Storage Memory RAM", 16 pages.
Office Action for U.S. Appl. No. 13/451,951, dated Jan. 7, 2014, Kimmo J. Mylly, "Managing Operational State Data in Memory Module", 24 pages.
Office Action for U.S. Appl. No. 13/951,169, dated Oct. 8, 2013, Jani Hyvonen, "Extended Utilization Area for a Memory Device", 9 pages.
Office Action for U.S. Appl. No. 13/358,806, dated Nov. 27, 2013, Kimmo J. Mylly, "Apparatus and Method to Provide Cache Move With Non-Volatile Mass Memory System", 26 pages.
Office action for U.S. Appl. No. 13/358,806, dated Nov. 6, 2015, Mylly et al., "Apparatus and Method to Provide Cache Move With Non-Volatile Mass Memory System", 44 pages.
Non-Final Office Action for U.S. Appl. No. 14/863,253, dated Dec. 21, 2015, Matti Floman, "Virtual Memory Module", 15 pages.
Final Office Action for U.S. Appl. No. 13/451,951, dated Dec. 4, 2014, Kimmo J. Mylly, "Managing Operational State Data of a Memory Module Using Host Memory in Association with State Change", 24 pages.
Office Action for U.S. Appl. No. 14/520,030, dated Dec. 4, 2014, Olli Luukkainen, "Apparatus and Method to Share Host System RAM with Mass Storage Memory RAM", 6 pages.
Office action for U.S. Appl. No. 12/455,763, dated Mar. 14, 2014, Luukkainen et al., "Apparatus and method to share host system ram with mass storage memory ram", 6 pages.
Final Office Action for U.S. Appl. No. 13/951,169, dated Mar. 27, 2014, Jani Hyvonen, "Extended Utilization Area for a Memory Device", 10 pages.
Office Action for U.S. Appl. No. 13/358,806, dated Apr. 30, 2015, Kimmo J. Mylly, "Apparatus and Method to Provide Cache Move With Non-Volatile Mass Memory System", 42 pages.
Final Office Action for U.S. Appl. No. 14/520,030, dated May 20, 2015, Olli Luukkaninen, "Apparatus and Method to Share Host System RAM with Mass Storage Memory RAM", 6 pages.

(56) References Cited

OTHER PUBLICATIONS

Office Action for U.S. Appl. No. 13/451,951 dated Jun. 18, 2015, Kimmo J. Mylly, "Managing Operational State Data of a Memory Module Using Host Memory in Association with State Change", 33 pages.
Office action for U.S. Appl. No. 13/527,745, dated Jun. 23, 2014, Floman et al., "Virtual Memory Module", 13 pages.
Office Action for U.S. Appl. No. 14/732,507, dated Jul. 1, 2015, Jani Hyvonen, "Extended Utilization Area for a Memory Device", 11 pages.
Office action for U.S. Appl. No. 13/951,169, dated Jul. 28, 2014, Hyvonen et al., "Extended Utilization Area for a Memory Device", 6 pages.
Office action for U.S. Appl. No. 12/455,763, dated Aug. 1, 2013, Luukkainen et al., "Apparatus and method to share host system ram with mass storage memory ram", 28 pages.
Final Office Action for U.S. Appl. No. 13/358,806, dated Sep. 10, 2014, Kimmo J. Mylly, "Apparatus and Method to Provide Cache Move With Non-Volatile Mass Memory System", 27 pages.
Office action for U.S. Appl. No. 14/732,507, dated Dec. 10, 2015, Hyvonen et al., "Extended Utilization Area for a Memory Device", 9 pages.
The PCT Search Report dated Feb. 25, 2015 for PCT application No. PCT/US2014/069616, 10 pgs.
The PCT Search Report and Written Opinion dated Apr. 16, 2014 for PCT application No. PCT/US13/49434, 8 pages.
The PCT Search Report and Written Opinion dated Sep. 5, 2013 for PCT application No. PCT/US13/37298, 9 pages.
International Search Report for PCT Application No. PCT/FI2009/050083 dated Jun. 3, 2009, pages.
Tanenbaum, "Structured Computer Organization", Prentice-Hall, Inc, 1984, 5 pages.
The Chinese Office Action dated Jun. 20, 2017 for Chinese Patent Application No. 201380006769.8, a counterpart foreign application of U.S. Pat. No. 9,417,998, 8 pgs.
The European Office Action dated Jul. 5, 2017 for European patent application No. 09715221.9, a counterpart foreitgn application of U.S. Pat. No. 8,307,180, 6 pages.
Office action for U.S. Appl. No. 15/181,293, dated Oct. 5, 2017, Hyvonen et al., "Extended Utilization Area for a Memory Device", 7 pages.
The Taiwanese Office Action dated Aug. 11, 2017 for Taiwanese patent application No. 106101747, a counterpart foreign application of U.S. Pat. No. 9,311,226, 18 pgs.
The Chinese Office Action dated Dec. 15, 2017 for Chinese Patent Application No. 201510093389.3, a counterpart foreign application of U.S. Pat. No. 8,307,180.
The Taiwanese Office Action dated Jan. 18, 2018 for Taiwanese Patent Application No. 106101747, a counterpart foreign application of U.S. Pat. No. 9,311,226.
Office action for U.S. Appl. No. 15/181,293, dated Apr. 18, 2018, Hyvonen et al., "Extended Utilization Area for a Memory Device", 11 page.
Final Office Action for U.S. Appl. No. 15/235,425, dated Jun. 12, 2018, Mylly, "Apparatus and Method to Provide Cache Move With Non-Volatile Mass Memory System", 16 pages.

* cited by examiner

| Command from Host Device or Attribute (in existing cmd) | Mass memory Module (20) Setting | Resulted Operation |
|---|---|---|
| *Force reading from NAND (26) or deny reading from system memory | Any | Operation state data read from the NAND (26) |
| Allow reading from system memory (14G) or don't care | Read from NAND (26) | Read from NAND (26) |
| | Read from system memory (14G) | Read from system memory (14G) |

* Note: if host system (12) knows that data in system memory (14G) has been compromised it can force the memory controller (22) to rebuild needed information from NAND (26).

Figure 8

MANAGING OPERATIONAL STATE DATA IN MEMORY MODULE

PRIORITY APPLICATIONS

This patent application claims priority to and is a continuation of U.S. Utility patent application with Ser. No. 13/451,951, filed Apr. 20, 2012. The entire contents of the U.S. Utility patent application having Ser. No. 13/451,951 are fully incorporated herein by reference.

TECHNICAL FIELD

The exemplary and non-limiting embodiments of this invention relate generally to memory storage systems, and, more specifically, relate to managing/configuring by a memory module controller storing operational state data for a memory module.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

ASIC application specific integrated circuit
CPU central processing unit
DMA direct memory access
DRAM dynamic random access memory
eMMC embedded multimedia card
exFAT extended file allocation table
HW hardware
IO input output
JEDEC joint electron device engineering council
LBA logical block address
MMM, MM mass memory module or memory module
MMC multi media card
MMCO memory module controller
MRAM magnetic random access memory
OS operations system
P2L physical to logical
PCRAM phase change random access memory
RAM random access memory
RRAM resistive random access memory
SATAIO serial advanced technology attachment international organization
SCSI small computer system interface
SD secure digital
SM system memory or host system memory
SRAM static random access memory
SSD solid state drive
SW software
UFS universal flash storage Various types of flash-based mass storage memories currently exist. A basic premise of mass storage memory is to hide the flash technology complexity from the host system. A technology such as eMMC is one example. A managed-NAND type of memory can be, for example, an eMMC, SSD, UFS or a microSD.

FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC. The JEDEC eMMC includes, in addition to the flash memory itself, an intelligent on-board controller that manages the MMC communication protocol. The controller also handles block-management functions such as logical block allocation and wear leveling. The interface includes a clock (CLK) input. Also included is a command (CMD), which is a bidirectional command channel used for device initialization and command transfers. Commands are sent from a bus master to the device, and responses are sent from the device to the host. Also included is a bidirectional data bus (DAT[7:0]). The DAT signals operate in push-pull mode. By default, after power-up or RESET, only DAT0 is used for data transfer. The memory controller can configure a wider data bus for data transfer using either DAT[3:0] (4-bit mode) or DAT[7:0] (8-bit mode).

One non-limiting example of a flash memory controller construction is described in "A NAND Flash Memory Controller for SD/MMC Flash Memory Card", Chuan-Sheng Lin and Lan-Rong Dung, IEEE Transactions of Magnetics, Vol. 43, No. 2, February 2007, pp. 933-935 (hereafter referred to as Lin et al.) FIG. 1B reproduces FIG. 1 of Lin et al., and shows an overall block diagram of the NAND flash controller architecture for a SD/MMC card. The particular controller illustrated happens to use a w-bit parallel Bose-Chaudhuri-Hocquengham (BCH) error-correction code (ECC) designed to correct random bit errors of the flash memory, in conjunction with a code-banking mechanism.

SUMMARY

According to a first aspect of the invention, a method, comprising: dynamically managing, by a memory module controller of a mass memory module, storage of all or a portion of operational state data for operating the memory module controller into an extended random access memory comprised in a memory of the mass memory module and in a host system memory of a host device; and reading, by the memory module controller after waking up from a shut down or a sleep state of the mass memory module, at least a part of the operational state data from one or more of: the extended random access memory and a non-volatile mass memory to restore an operational state of the memory module controller.

According to a second aspect of the invention, an apparatus, comprising: a mass memory module comprising an extended random access memory together with a portion of a host system memory in a host device; and a memory module controller configured to dynamically manage storage of all or a portion of operational state data for operating the memory module controller into an extended random access memory comprised in a memory of the mass memory module and in the host system memory of the host device, and further configured to read, after waking up from a shut down or a sleep state of the mass memory module, a part of the operational state data from one or more of: the extended random access memory and a non-volatile mass memory of the mass memory module to restore an operational state of the memory module controller.

BRIEF DESCRIPTION OF THE DRAWINGS

In the attached Drawing Figures:

FIG. 8 is a diagram demonstrating embodiments shown in the flow chart in FIG. 6 relating to responding by a memory module controller to a command (or an attribute in the command) from a host device.

DETAILED DESCRIPTION

Of interest to the ensuing description of the exemplary embodiments of this invention is commonly-assigned U.S. patent application Ser. No. 12/455,763, filed Jun. 4, 2009, "Apparatus and Method to Share Host System RAM with Mass Storage Memory RAM", Olli Luukkainen, Kimmo Mylly and Jani Hyvonen (US 2010/0312947 A1), incorporated by reference herein. Before describing in detail the exemplary embodiments of this invention it will be useful to review at least a portion of the description of this commonly-assigned U.S. patent application Ser. No. 12/455,763.

As is stated, at present most mass storage memories provide LBA-based access, e.g., eMMC and different types of external memory cards such as SD. However, it may also be the case that the entire file system (FS) SW is embedded in the mass storage memory device.

When a mass storage memory is used in a high volume consumer device, such as a mobile wireless communication device, one important consideration is cost, and one factor affecting the cost is the amount of RAM in the mass storage memory device itself.

Another important consideration is performance. The overall performance depends on many factors. For example, for lengthy (time consuming) operations (in particular if the mass storage memory device contains an entire file system SW) there would be an advantage to include a substantial amount of RAM in the mass storage memory device. However, this can have a negative impact on the cost.

It may be the case that system context (metadata) would be stored in the flash memory of the mass storage memory device. However, this approach has several associated disadvantages. For example, repeatedly writing the system context (metadata) to the mass storage memory device raises wearing issues that can impact the usable life of the mass storage memory device. Also, writing data to the flash memory can be a relatively slow process.

Another important consideration is the power efficiency. To provide good power efficiency the mass storage memories are preferably shutdown (powered-off) when not needed (meaning also that the internal RAM of the device is preferably shutdown as well). However, and assuming that the RAM is volatile in nature, then whatever data is stored in the RAM is lost when the power is removed from the RAM. To then perform re-initialization after power-up all needed information (e.g., logical-to-physical mapping information and/or file system structures) need to be restored. A full re-initialization of a LBA mass storage memory may require a substantial (and user-noticeable) amount of time (e.g., up to one second with an SD card), and entire file system initialization (if the file system is resident in the mass storage memory) may take even longer. Therefore, it is desirable to retain internal device context over the power-off/power-on cycle.

Figure 1A:
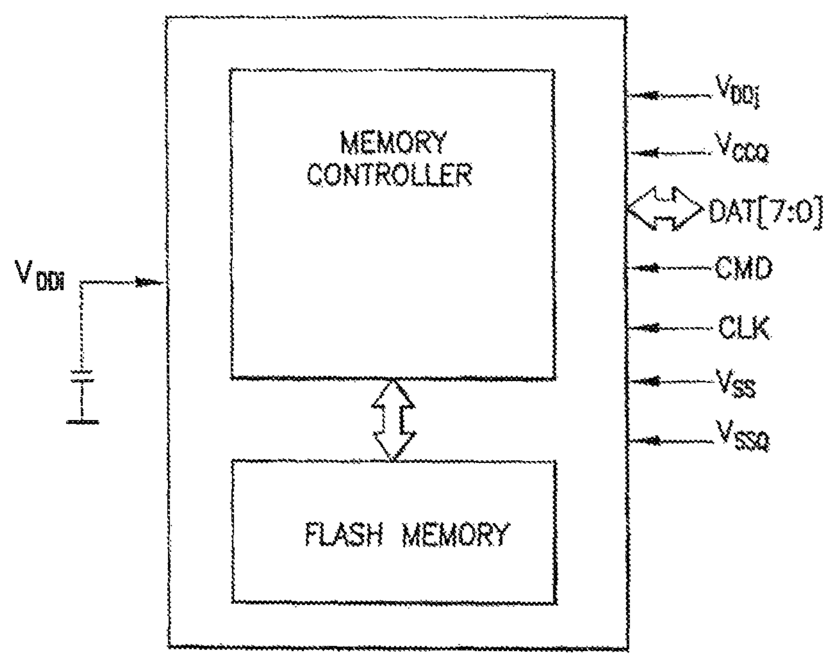
FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC.
Figure 1B:
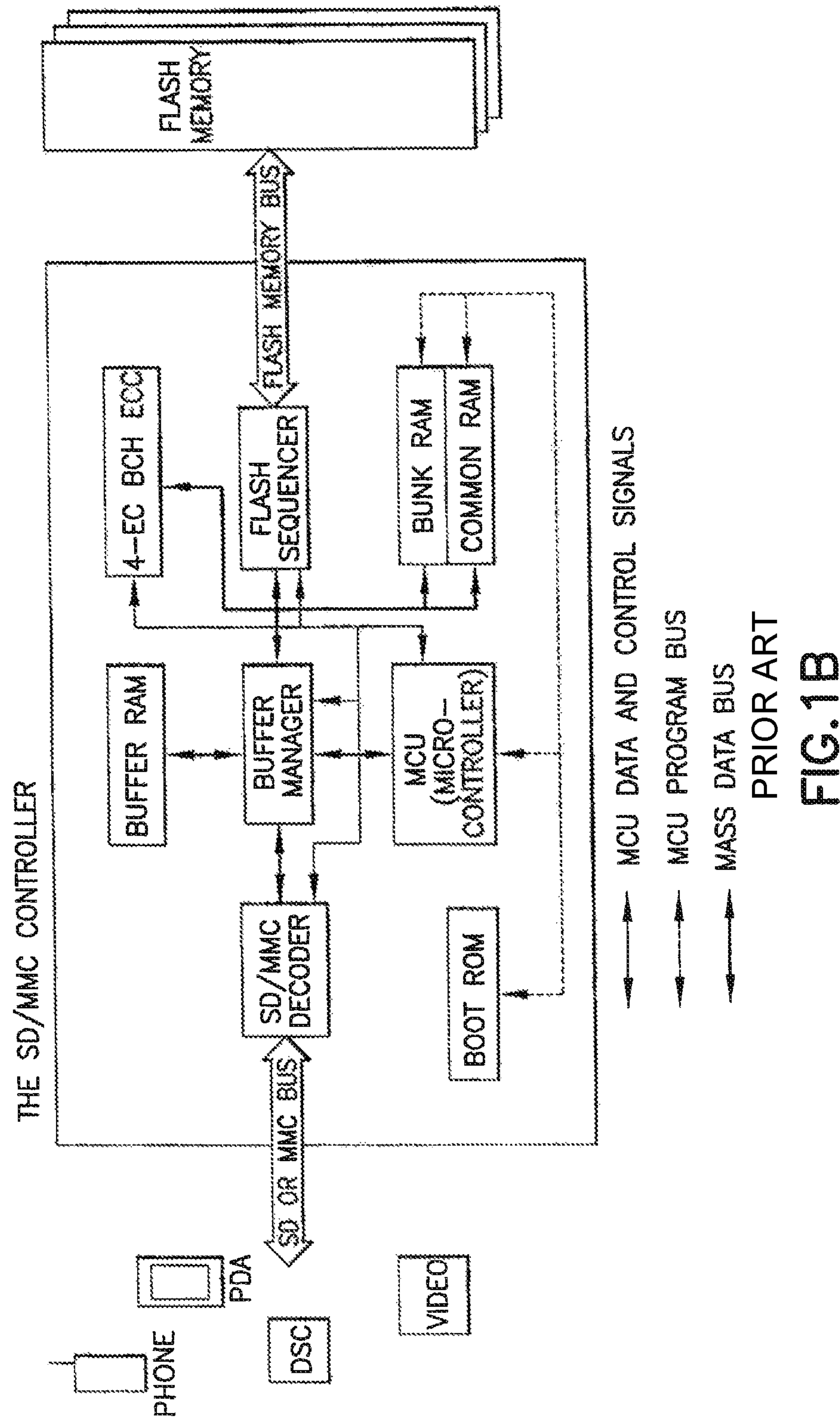
FIG. 1B reproduces FIG. 1 of Lin et al., and shows an example of an overall block diagram of a NAND flash controller architecture for a SD/MMC card.
Figure 2:
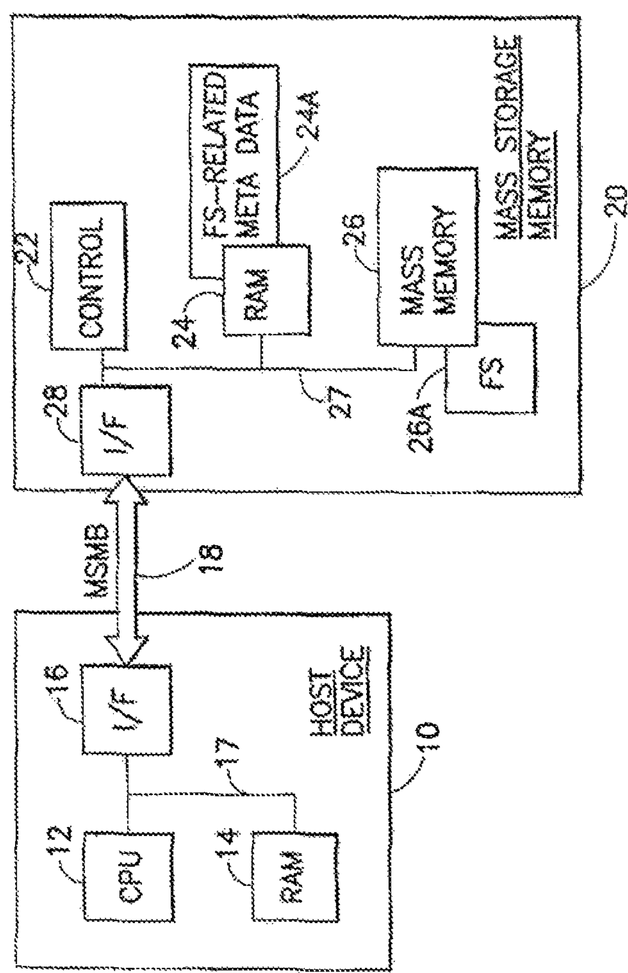
FIG. 2 is a simplified block diagram of a host device connected with a mass storage memory device, and is helpful in describing the exemplary embodiments of the invention.

FIG. 2 shows a simplified block diagram of a host system or device 10 connected with a mass storage memory 20 via a mass storage memory bus (MSMB) 18. The MSMB 18 may be compatible with any suitable mass memory interface standard such as MMC or UFS, as two non-limiting examples. The MSMB 18 may include signal lines such as those shown in FIG. 1A for an eMMC embodiment. The host device 10 includes at least one controller, such as a CPU 12 that operates in accordance with stored program instructions. The program instructions may be stored in a RAM 14 or in another memory or memories. The CPU 12 is connected with the RAM 14 and a MSMB interface (I/F) 16 via at least one internal bus 17. The MSMB interface 16 may include a memory controller (MC), or may be coupled with a MC unit associated with the CPU 12. The host device 10 may be a computer, a cellular phone, a digital camera, a gaming device or a PDA, as several non-limiting examples. Note that the RAM 14 may be any read/write memory or memory device, such as semiconductor memory or a disk-based memory.

The mass storage memory 20 includes a microcontroller or, more simply, a controller 22 that is connected via at least one internal bus 27 with a volatile RAM 24, a non-volatile mass memory 26 (e.g., a multi-gigabyte flash memory mass storage) and a MSMB interface (I/F) 28. The controller 22 operates in accordance with stored program instructions. The program instructions may be stored in the RAM 24 or in a ROM or in the mass memory 26. The mass storage memory 20 may be embodied as an MMC, eMMC, UFS or a SD device, as non-limiting examples, and may be external to (plugged into) the host device 10 or installed within the host device 10. Note that the mass memory 26 may, in some embodiments, store a file system (FS) 26A. In this case then the RAM 24 may store FS-related metadata 24A, such as one or more data structures comprised of bit maps, file allocation table data and/or other FS-associated information.

The embodiments of the invention described in commonly-assigned U.S. patent application Ser. No. 12/455,763 provide a technique to share the RAM 14 of the host device 10 with the mass storage memory device 20. It can be assumed that the host device 10 (e.g., a mobile computer, a cellular phone, a digital camera, a gaming device, a PDA, etc.) has the capability to allocate and de-allocate the RAM 14. The allocation of the RAM 14 may be performed dynamically or it may be performed statically. The allocation of a portion of the RAM may be performed in response to a request received at the host device 10, or at the initiative of the host device 10.

In the embodiments of the invention described in commonly-assigned U.S. patent application Ser. No. 12/455,763 the RAM 14 allocation is provided for the mass storage memory 20 (connected via the MSMB 18 to the host CPU 12), if the mass storage memory 20 has a need to extend its own RAM 24 space and/or if the mass storage memory 20 has a need for non-volatile RAM (the contents of which are not lost when the mass storage memory 20 is powered-off). The mass storage memory 20 can also read and/or write (R/W) allocated RAM 14 in the host device 10. The allocation/de-allocation and R/W access methods can be implemented by extensions to a command set used to communicate with the mass storage memory 20 via an applicable mass storage memory protocol.

Figure 3:
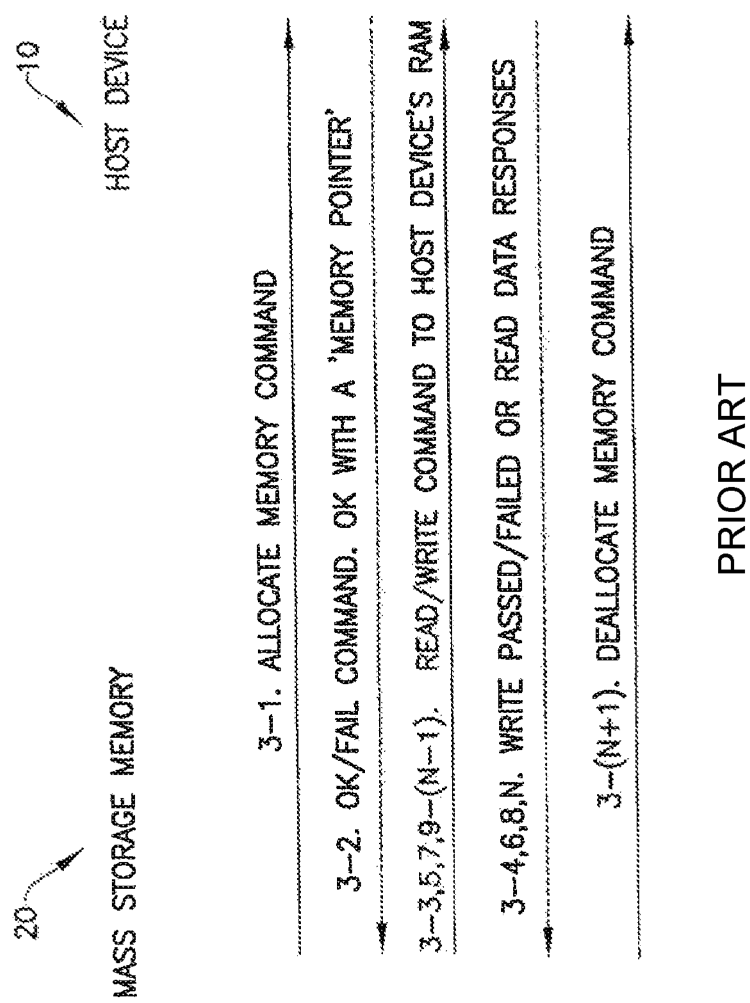
FIG. 3 is a signal/message flow diagram that describes an embodiment of the invention described in commonly-assigned U.S. patent application Ser. No.: 12/455,763, where the mass storage memory device of FIG. 2 can allocate, use and de-allocate RAM of the host device.

In accordance with certain embodiments of the invention described in commonly-assigned U.S. patent application Ser. No. 12/455,763 the mass storage memory device 20 is provided with a mechanism to interrupt/send a message to host device 10 to initiate an allocation of space in the RAM 14. The interrupt/message is sent over the MSMB 18, and may be considered as an extension to current command sets. Referring to FIG. 3, an allocate memory command is sent during operation 3-1. If the allocation request succeeds (indicated during operation 3-2) the controller 22 is enabled to extend its own RAM 24 with the RAM 14 of the host device 10. The mass storage memory device 20 may store, for example, large tables into the RAM 14 using a RAM WRITE command or it may fetch data from the host device RAM 14 using a RAM READ command. The read or write operation is shown as interleaved operations 3-3, 3-4, 3-5, 3-6, . . . , 3-(N−1), 3-N. When the mass storage memory device 20 completes the operation with the RAM 14 it may free the host device RAM 14 using another command that requests that the host 10 RAM memory be de-allocated (operation 3-(N+1)).

Figure 4:
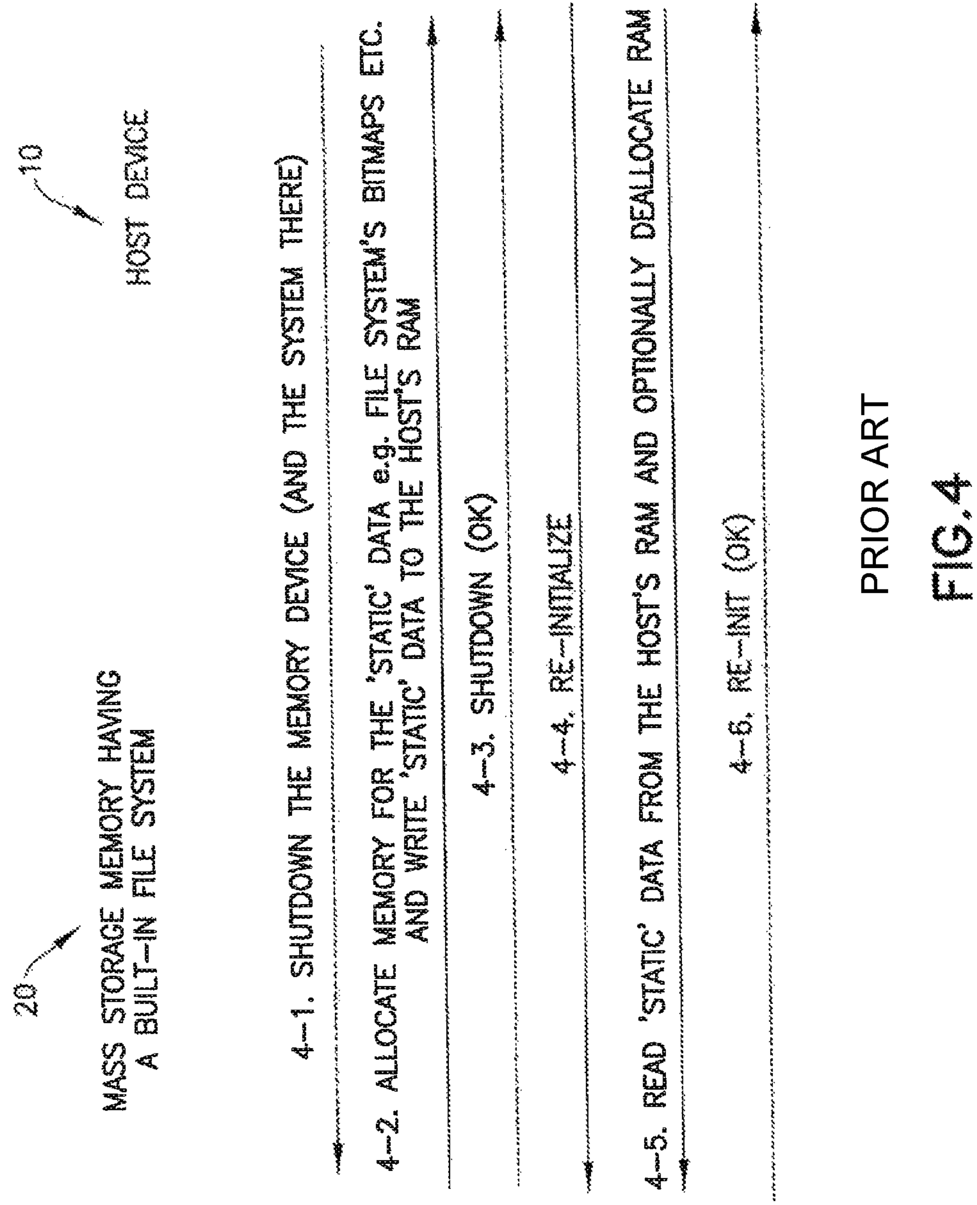
FIG. 4 is a signal/message flow diagram that describes another embodiment of the invention described in commonly-assigned U.S. patent application Ser. No.: 12/455,763, where the mass storage memory device of FIG. 2 has a built-in file system.

FIG. 4 illustrates a further exemplary embodiment described in commonly-assigned U.S. patent application Ser. No. 12/455,763 that utilizes the host system RAM 14 for the mass storage memory 26 having a built-in file system, such as the FS 26A shown in FIG. 2. First the host system 10 sends a SHUTDOWN command to the mass storage memory device 20 (operation 4-1). Next the mass storage memory device 20 allocates RAM 14 from the host 10 and then loads (stores using a RAM WRITE command) all vital 'static' file system-related data (meta-data 24A) into host RAM 14 (operation 4-2). 'Static' data in this context may be, for example, various bitmaps, such as an allocation bitmap in the exFAT or ext3 file systems. This data may be processed (e.g., at least one of sorted, arranged and filtered) by the CPU 12 (controller) of the host device, and may include data from a large number of sectors in the mass storage memory 26. Mass memory storage device 20 may then send a shutdown OK indication (operation 4-3). The host 10 can remove power from the mass memory storage device 20, and the device 20 may be physically removed from the MSMB 18. Re-initialization (operations 4-4, 4-5, 4-6) of the mass storage memory device 20 is performed when host device 10 needs to get/put certain data from or into the mass storage memory device 20. Re-initialization of the mass storage memory 26 (and the file system 26A) may be sped up by using the sorted/arranged/filtered read data from the RAM 14. When the re-initialization operation is completed the mass storage memory device 20 may de-allocate the used RAM 14 in the host device 10, or the RAM 14 may not be de-allocated thereby reserving the RAM space for future use by the mass storage memory device 20.

The allocation of host RAM 14 may occur differently in some embodiments. For example, the host device 10 may allocate RAM 14 dynamically and pass a 'pointer' to the allocated RAM to the mass storage memory device 20. It is then up to the controller 22 of the mass storage memory device 20 how to utilize the allocated host RAM 14. Note that in this embodiment an explicit allocation request from the mass storage memory device 20 may not be sent to the host device 10. Instead, the host device 10 may on its own initiative allocate a portion of the RAM 14, such as when it first detects the presence of the mass memory storage device 20. Of course, subsequent signaling between the mass storage memory device 20 and the host device 10 may be used to change the size of the allocated RAM 14 if the initial allocation is not sufficient for the needs of the controller 22. As another example of RAM 14 allocation, a portion of the RAM 14 may be allocated by the host 10 in a static manner and the mass storage memory device 20 then simply uses the same portion of the RAM 14 each time it needs to extend the RAM 24. In this case the mass storage memory device 20 may already have knowledge of the location/size of the allocated RAM 14, and a pointer is not needed to be sent from the host device 10.

Note that while it may typically be the case that the mass storage memory device 20 will receive an allocation of host memory to store contents of the volatile RAM 24, in general the allocation may be for storing data for any read/write memory contained within the mass storage memory device 20.

Having thus provided an overview of various non-limiting and exemplary embodiments of the invention described in the commonly-assigned U.S. patent application Ser. No. 12/455,763, a description is now made of the exemplary embodiments of this invention. In a managedNAND memory (e.g., eMMC, SSD, UFS, microSD) the memory controller (such as the controller 22 shown in FIG. 2) takes care of the flash management functions such as bad block management and wear leveling. In a typical low cost implementation there is only a small input/output (TO) buffer SRAM in the managedNAND. Embedded in the controller in higher end managedNANDs such as SSDs there may be tens to hundreds of megabits of discrete DRAM as cache. In the future some new memory technologies such as MRAM could serve as very fast non-volatile cache also.

The embedded memory in the controller is not sufficient enough to store all the run time data needed by the module and thus some portion of the run time data is stored/mirrored in non-volatile memory (e.g. NAND) of the module. This is also necessary to avoid loss of (operation) data in case of sudden power down. The non-volatile mass memory, such as NAND, is very slow for storing/reading such data, if compared to typical volatile/non-volatile execution memories like SRAM/DRAM/MRAM. This causes delay to operation of the memory module. For example, after power up the whole mass memory subsystem needs to be re-initialized from NAND and this may take time up to is (e.g. eMMC, SD, SATAIO devices).

Figure 5A:
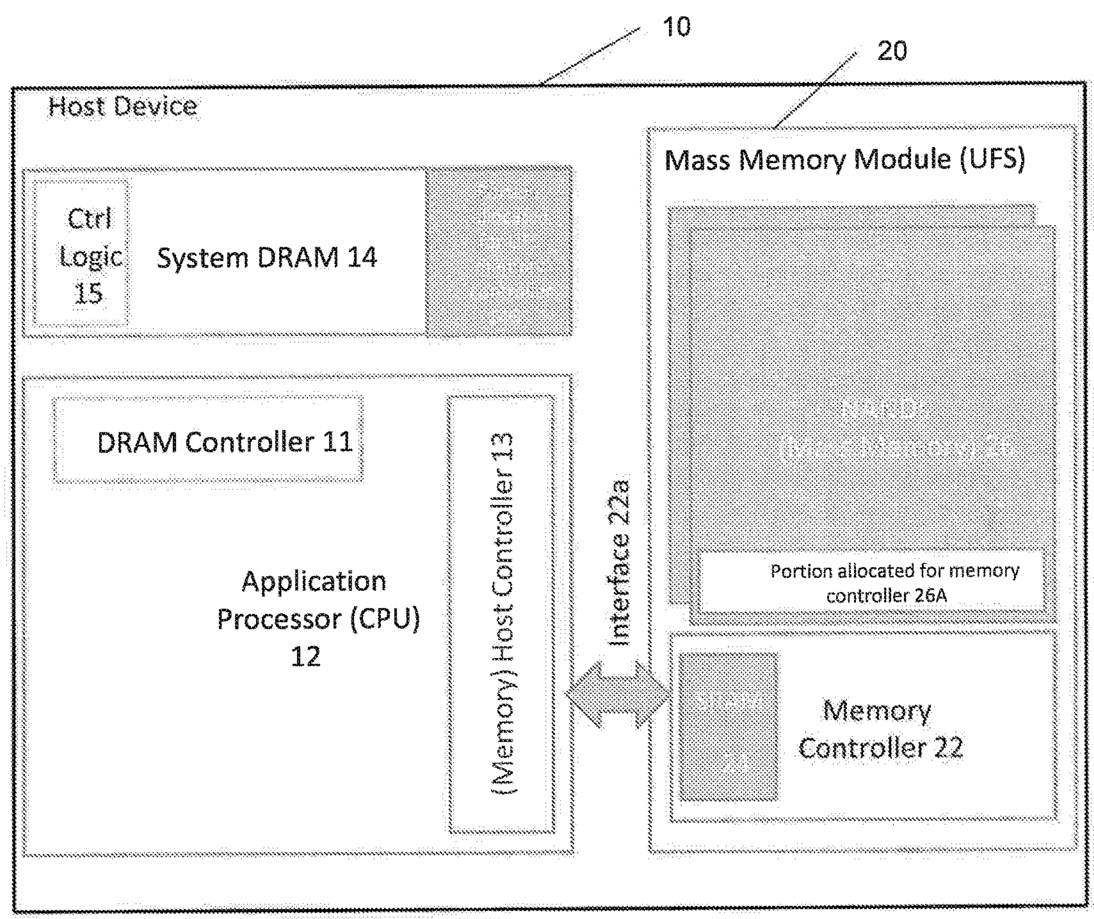
FIGS. 5A and 5B, collectively referred to as FIG. 5, are representations of the host device and mass memory module in accordance with embodiments of the invention.
Figure 5B:
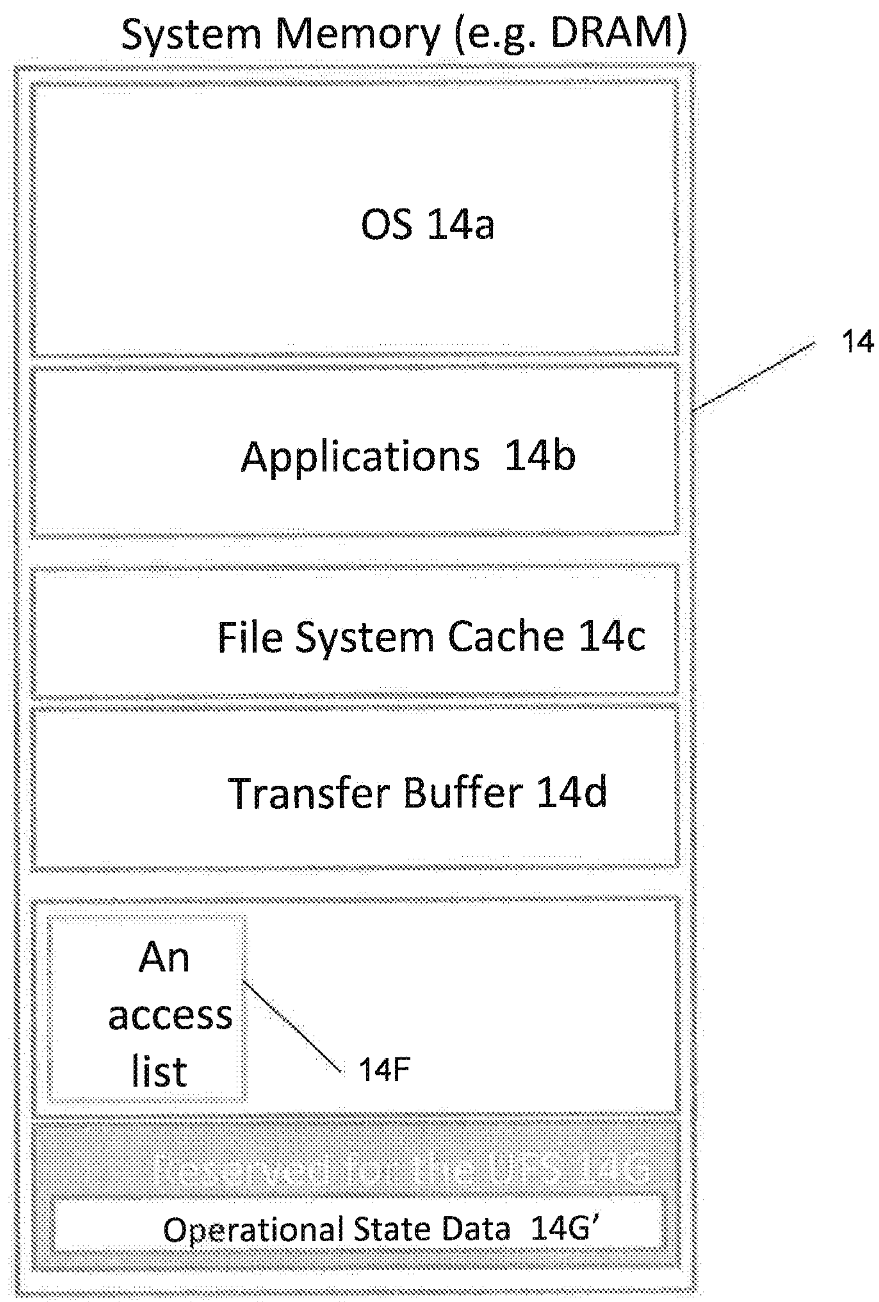

Reference can be made to FIG. 5 where those components described in reference to FIG. 2 are numbered accordingly. In FIGS. 5A and 5B a portion 14G of the system RAM (e.g., DRAM) 14 is allocated for use by the mass memory module 20 (described here in a non-limiting embodiment as a UFS memory module or a memory module). The host device 10 includes an application processor that can be embodied as the CPU 12. Included with or coupled to the application processor 12 may be a DRAM controller 11 for the DRAM 14. Also present is the above-mentioned mass memory module 20 (e.g., UFS) host controller 13. The host controller 13 can be embodied as the CPU 12 or it can be embodied as a separate device. The mass memory module (MMM) 20 (which is also called herein a memory module, MM, 20) may be connected to the host device through an interface 22*a*, e.g., via a bus (e.g., like the mass storage memory bus 18 shown in FIG. 2) Also the memory module 20 can be a part of the host device 10 as shown in FIG. 5*a* or it may be a separate device as shown in FIG. 2.

Furthermore, the memory module 20 may comprise a non-volatile memory (e.g., NAND) 26 (or mass memory) with a portion 26A allocated for the memory controller and a memory controller 22 with an SRAM 24. For the purpose of this invention, the SRAM 24 and a portion 14G of the system DRAM 14 may be considered as an extended random access memory. It should be noted that an execution memory 24 of the memory controller 22 and/or the host system memory 14 could be a non-volatile memory such as MRAM, PCRAM and/or RRAM.

FIG. 5B shows that the system DRAM 14 stores an operating system (OS) 14*a* and application programs (applications) 14*b*. The system DRAM 14 also typically stores a file system cache 14*c* associated with a file system (part of the OS). In the embodiment of FIG. 5B a portion of the system DRAM 14 is allocated as a transfer buffer 14*d*. Another portion of the system DRAM 14 is allocated to store an access list 14F. Also included is the DRAM portion 14G that is allocated for the memory module 20, and into which the operation state data can be moved for the memory module 20.

The commonly-assigned U.S. patent application Ser. No. 12/455,763 further describes enabling the memory module to utilize the system DRAM to store data to and read data from (e.g., see FIGS. 3-4 above). This could be further utilized in embodiments described herein to enable the mass storage memory module, for example, to store its state into the system DRAM, then go to sleep/power down and after wake up/power up read back quickly the previous state. In a managed NAND environment this storing and reading of the state of operation could be taken care by the mass memory module 20 itself and in particular by the memory module controller 22, rather than by the host device 10 as the memory module itself knows best which data is needed to be stored and which portion of the run time data is allowed to be lost, e.g., during power down.

A new method and apparatus are presented for managing/configuring by the memory module controller (e.g., memory module controller 22 shown in FIG. 5*a*) storing operational state data for operating the memory module controller into extended random access memory comprised in a memory module and host system memory (e.g., DRAM 14) during various operational modes/conditions of the memory module 20 and the host system memory (e.g., the DRAM 14). Essentially, the memory module controller operated as a master for the data transfers as described herein. The operational state data typically comprises one or more of state information, a logical to physical (L2P) mapping table and register settings.

The memory module controller, after waking up from a shut down or a sleep state of the mass memory module, can read at least a part of the operational state data from the extended random access memory and/or from a non-volatile mass memory to restore an operational state of the memory module controller. The reading can be based on settings of the mass memory module or based on a command or an attribute of a command from the host device which can override the settings of the mass memory module. Alternatively, the setting can override the command or the attribute from the host device.

The settings of the mass memory module may be registers settings visible also outside (e.g., access to DRAM disabled/enabled) or internal settings visible only to the memory module controller, e.g., information from which source (extended random access memory or flash memory) it would be most efficient to load the operational state data.

It is also noted that a command/attribute from the host (at an initialization phase) may override above mentioned internal settings in the mass memory module, for example, by denying access to DRAM in the host device (compromised data case) or alternatively the command may indicate that the mass memory module is free to initialize from any source.

Furthermore, the operational state data may be divided at least into high priority data (e.g., at least state information and possibly some L2L mapping table) and low priority data (e.g., register settings), so that the high priority data is stored in the DRAM portion 14G of the extended random access memory. But more than two priority levels can be used as well for classifying the operational state data, e.g. lowest priority data may be stored in the portion 26A of the non-volatile memory.

The fundamental principle for such data transfers is based on utilizing fast extended random access memory both in the memory module 20 and in a host system memory (DRAM portion 14G) of the host device 10 whenever possible over relatively slow non-volatile memory 26. This can gain an advantage for faster waking up and saving power as the memory module can be powered down more often.

Figure 6:
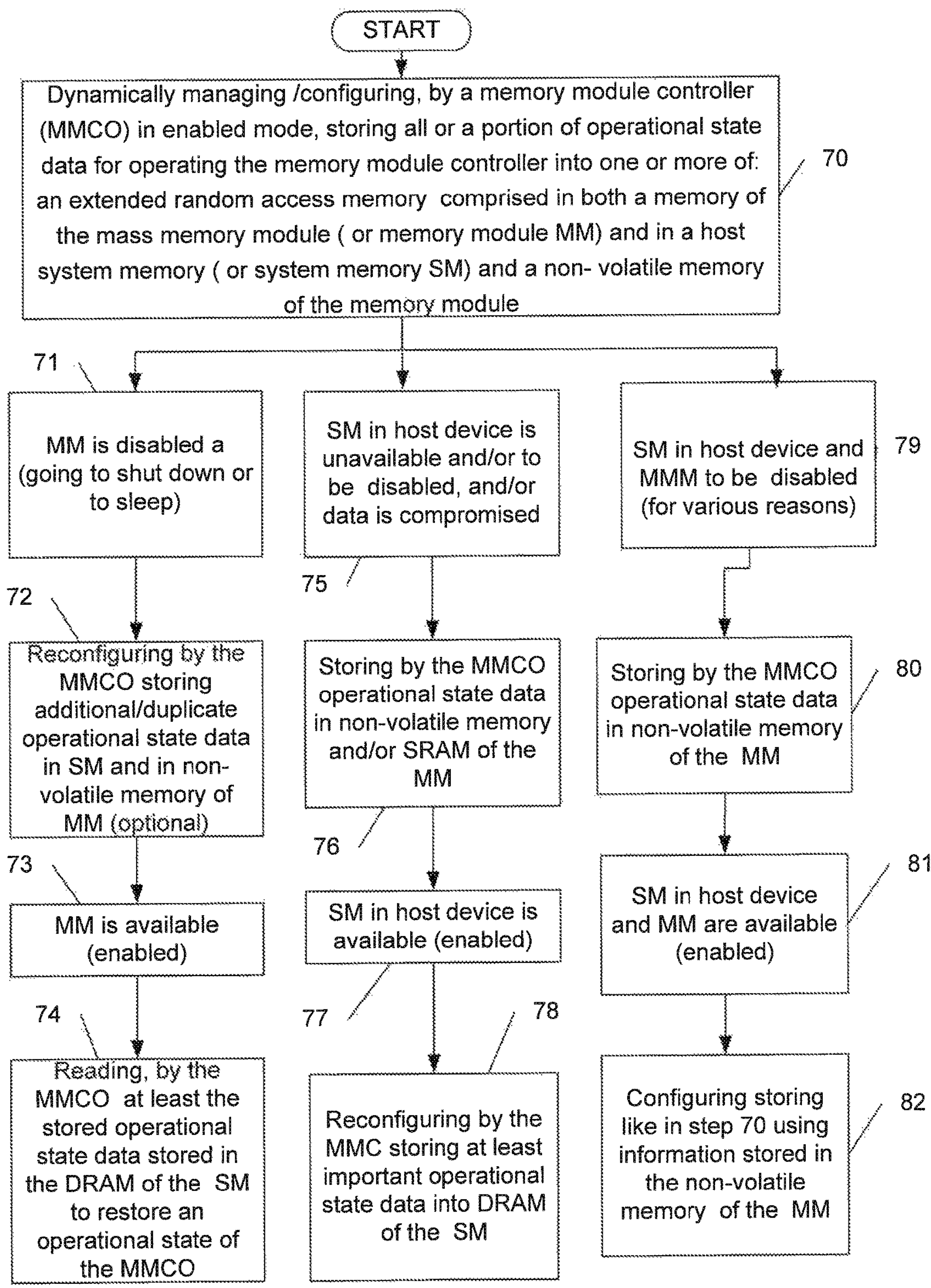
FIG. 6 is a logic flow diagram that illustrates the operation of a method, and a result of execution of computer program instructions embodied on a computer readable memory, further in accordance with the exemplary embodiments of this invention.

FIG. 6 shows a logic flow diagram that illustrates the operation of a method, and a result of execution of computer program instructions embodied on a computer readable memory, further in accordance with the exemplary embodiments of the invention as described herein. It is noted that the order of steps shown in FIG. 6 is not absolutely required, so in principle, the various steps may be performed out of the illustrated order. Also certain steps may be skipped, different steps may be added or substituted, or selected steps or groups of steps may be performed in a separate application.

In a method according to the exemplary embodiments, as shown in FIG. 6, in a first step 70, a memory module controller (MMCO), e.g., the memory module controller 22, dynamically manages/configures storing operational state data for operating the MMCO into one or more of: an extended random access memory (ERAM) comprised in both the memory module (MM) 20 (e.g., SRAM 24) and a host system memory (or system memory, SM) 14 (e.g., a dedicated portion 14G), and in a non-volatile memory (e.g., a dedicated portion 26A of the NAND memory 26 in the MM 20). For example, if both the MM and the SM are enabled to operate in a normal condition, the storing can be configured based on predefined rules. The important (high priority) data like the state information, and all or partial logical to physical (L2P) mapping tables may be stored (written) into DRAM portion 14G of ERAM and lower priority data into SRAM 24 portion of ERAM, but the lowest priority data (e.g., register settings) may be stored in the non-volatile memory 26 (e.g., in the portion 26A). Some of the high priority data of the operational state data may be also stored in the non-volatile memory 26 (and possibly in the SRAM 22) as a duplicate of the data stored in the DRAM portion 14G. Moreover, this storing arrangement of both MM 20 and SM 14 may be configured by the MMCO 22 automatically using a predetermined default arrangement.

Furthermore, the flow chart in FIG. 6 shows 3 scenarios, which may trigger reconfiguring by the MMCO 22 the storing arrangement established in step 70.

In one scenario, in step 71, the memory module 20 is to be disabled, e.g., going to shut down or sleep. In other words, the memory module can receive at least one of the following indications: power down indication or go to sleep/dormant mode command/state change from the host device, or automatically go to sleep/dormant mode after some defined timeout in the memory module.

In a next step 72, the MMCO reconfigures storing the operational state data in the SM (DRAM portion 14G) and possibly in the non-volatile memory (NAND 26) of the MM 20. For example, the MMCO 22 can add (write) in the DRAM portion 14G additional operational state data if possible (e.g., to the maximum capacity of the DRAM portion 14G) and further to back up (duplicate) the high priority data in the non-volatile memory. Also the low priority data such as register settings can be stored in the non-volatile memory portion 26A if not stored in the DRAM portion 14G. Step 72 may be performed by the MMCO 22 automatically based on the predefined procedure for the situation described in step 71.

In a next step 73, the MM is enabled (power up/wake up).

In a next step 74, the MMCO reads (during initialization) at least the operational state data stored in the DRAM portion 14G to restore an operational state of the MMCO 22. Also the information stored in the non-volatile memory portion NAND 26A as described in step 72 could be possibly used for restoring the operational state of the MMCO 22.

In another scenario, in step 75, the MMCO 22 ascertains (e.g., receiving a command from the host device or an attribute comprised in the command) that the SM (DRAM portion 14G) of the host device 10 is unavailable and/or to be disabled, and/or the data stored in the DRAM portion 14G is compromised.

Then in a next step 76, the MMCO 22 can store the operational state data from the DRAM portion 14G into the non-volatile memory 26A and/or SRAM 22 of the MM 20 before the SM in the host device becomes unavailable/disabled. If the operational state data stored in the SM is compromised, then the MMCO 22 can restore/rebuild needed information from the non-volatile memory (NAND 26) if that data is not available in the SRAM 22.

In a next step 77, the SM in the host device is enabled (power up/wake up which is signals to the MM 20).

In a next step 78, the MMCO 22 reconfigures storing at least important operational state data into the SM (DRAM 14) as in step 70.

Yet in another scenario, in step 79, both the memory module 20 and SM 14 are to be disabled, e.g., shut down or going to sleep. For example, the host device may issue a command of a total shutdown. In a next step 80, the MMCO reconfigures storing the operational state data in the non-volatile memory (NAND 26) of the MM.

In a next step 81, both the memory module 20 and SM 14 in host device are enabled (power up/wake up). In a next step 82, the MMCO configures recovering and storing the operational state data like in step 70 using information stored in the non-volatile memory (NAND 26) of the MM. It is further noted that this step may include the mass memory module initializing itself using all or selected operational state data stored in the non-volatile memory at step 80.

It is noted that reading and writing steps (e.g., see steps 72, 76, 80, 74, 78 and 82) may be performed by the MMCO 22 based on the command (or the attribute in the command) from the host device 10 and/or using its own judgment.

Figure 7A:
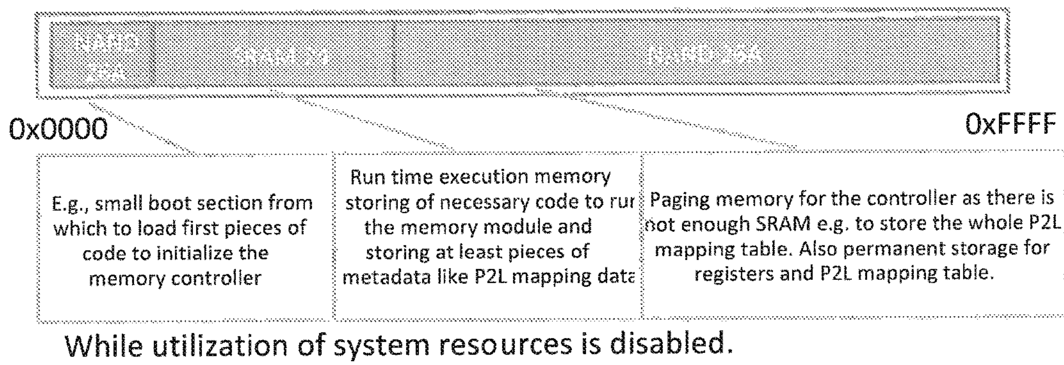
FIGS. 7A and 7B are examples of memory maps of the memory module controller in the memory module when utilization of system resources such as the portion DRAM 14G is disabled (FIG. 7A) or enabled (FIG. 7*b*)
Figure 7B:
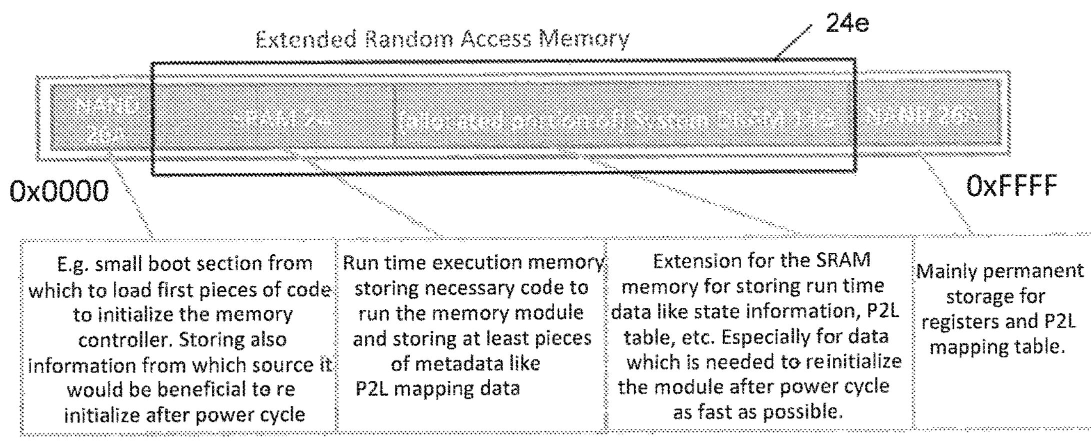

FIGS. 7*a*-7*b* and 8 further illustrate different embodiments disclosed in the flow chart of FIG. 6. For example, FIGS. 7*a* and 7*b* show examples of memory maps of the MMCO 22 in the MM 20 when utilization of system resources such as the DRAM portion 14G is disabled (FIG. 7*a*) and when utilization of system resources is enabled (FIG. 7*b*).

FIG. 7*a* (when DRAM portion 14G is not accessible/disabled) provides operational details for a non-volatile memory portion such as NAND portions 26A and SRAM 24 identified in FIG. 5. As shown in FIG. 7*a*, the NAND portion 26A shown on the left can store a small boot section from which to load first pieces of a code to initialize the memory module controller 22. The SRAM 24 can provide run time execution memory storing of necessary code to run the MM 20 and storing at least pieces of metadata like P2L mapping data. Also the NAND portion 26A shown on the right can be a paging memory for the MMCO 22 if there is not enough SRAM 24 to store the whole P2L mapping table; also NAND portion 26A can be a permanent storage for registers and P2L mapping table.

FIG. 7*b* (when DRAM 14G is accessible/enabled) provides operational details for NAND portions 26A, SRAM 24 and DRAM portion 14G identified in FIG. 5, where SRAM 24 and DRAM 14G form the extended random access memory. As shown in FIG. 7*b*, the NAND portion 26A on the left can store a small boot section from which to load first pieces of a code to initialize the memory controller. In addition, the NAND portion 26A can store information from which it would be beneficial to reinitialize after a power cycle. The SRAM 24 (as in FIG. 7*a*) can provide run time execution memory storing of necessary code to run the MM 20 and storing at least pieces of metadata like P2L mapping data. The NAND portion 26A on the right can also be mainly a permanent storage for registers and P2L mapping table. The main difference with FIG. 7*a* is now in the enabled state of the DRAM portion 14G which becomes an extension of the SRAM 24 (forming the extended random access memory) for storing run time data like state information, P2L mapping table, etc., especially for data which is needed to reinitialize the MMCO 22 after power cycle as fast as possible.

It is noted that the areas 26A shown in 7*a* and 7*b* could be also beside each other. Left side could be realized also by some boot ROM embedded in the MMCO, at least partly. It is further noted that memory map of the MMCO could be also a kind of a virtual map, not physical (as shown in FIGS. 7*a* and 7*b*).

FIG. 8 demonstrates another aspect of the embodiments shown in the flow chart in FIG. 6 relating operation of the MMCO 22 to a command (or an attribute in the command) from the host device 10. If the host device 10 (e.g., its CPU 12) knows that the data in the DRAM portion 14G has been compromised, it can send a command to the MM 20 to deny reading from the host system memory DRAM portion 14G thus forcing the MMCO 22 to read from the non-volatile memory like NAND portion 26A for any setting in the MM 20. Then the operation state of the MMCO 22 is read from the NAND portion 26A.

If the host device 10 (CPU 12) does not impose any restriction on reading from the DRAM portion 14G, then the operation state of the MMCO 22 is read from the DRAM portion 14G and possibly from the NAND portion 26A (for low-priority data).

It is noted that, the commands/attributes send by the host device 10 to the memory module 20 (e.g., through the interface 22*a* as shown in FIG. 5*a*) may have different levels of enforcement on the memory module controller 22. For example, the command for denying reading from the host system memory, i.e., from the DRAM portion 14G in reference to FIG. 8, may have a high enforcement level. Similarly another command or an attribute in a command of the host device forbidding writing in the host system memory (e.g., no extra space is available) additional information related to the operational state data may be also a high enforcement level command which cannot be overridden by the MMCO 22. An example of a low enforcement command/attribute by the host device may be when it enables utilization of 14G (or is not disabling it), leaving it up to the MMCO to decide. Low enforcement command/attribute could also be indication of power down by the host device, so that the MMCO can make the decision whether to perform read/write operation with the state data or not.

Figure 9:
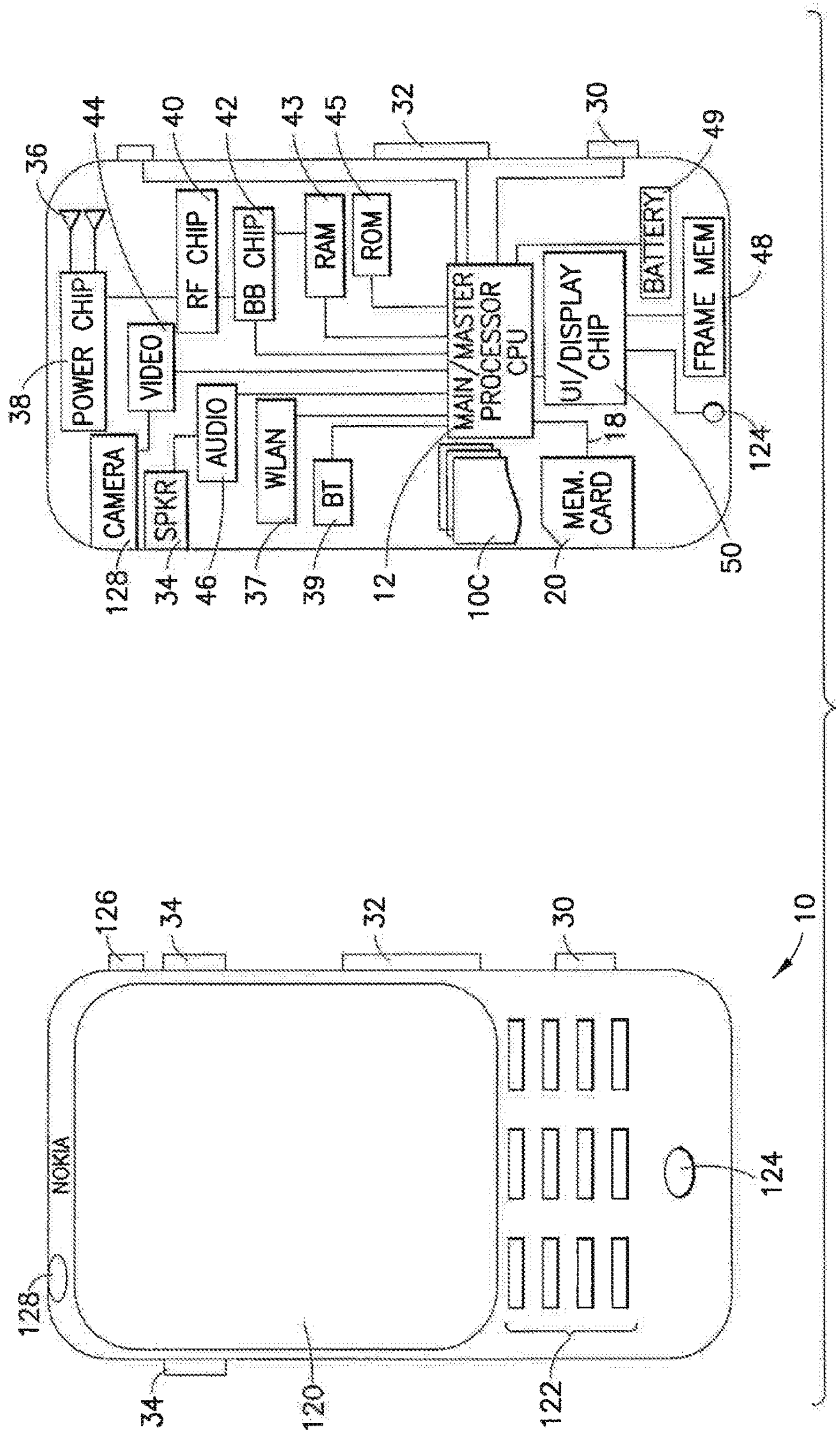
FIG. 9 shows a block diagram of one exemplary embodiment of the host device when embodied as a wireless communication device.

FIG. 9 illustrates one non-limiting embodiment of the host device 10 used with the mass storage memory device 20, referred to in FIG. 6 simply as a memory card 20. The mass storage memory device 20 can be removable or it can be embedded in the device 10. In this exemplary embodiment the host device 10 is embodied as a user equipment (UE), shown in both plan view (left) and sectional view (right). In FIG. 9 the host device (UE) 10 has a graphical display interface 120 and a user interface 122 illustrated as a keypad but understood as also encompassing touch screen technology at the graphical display interface 120 and voice recognition technology received at a microphone 124. A power actuator 126 controls the device being turned on and off by the user. The exemplary UE 10 may have a camera 128 which is shown as being forward facing (e.g., for video calls) but may alternatively or additionally be rearward facing (e.g., for capturing images and video for local storage). The camera 128 is controlled by a shutter actuator 30 and optionally by a zoom actuator 32 which may alternatively function as a volume adjustment for the speaker(s) 34 when the camera 128 is not in an active mode.

As an example, image data captured by the camera 128 can be stored in the mass storage memory device 20 under control of a camera application and can thus benefit from the use of the embodiments of this invention. As another example, audio data captured by the microphone 124 can be stored in the mass storage memory device 20 under control of an audio application and can thus also benefit from the use of the embodiments of this invention.

Within the sectional view of FIG. 9 are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to a radio frequency (RF) chip 40 which demodulates and downconverts the signal for baseband processing. A baseband (BB) chip 42 detects the signal which is then converted to a bit stream and finally decoded. Similar processing occurs in reverse for signals generated in the host device 10 and transmitted from it.

Signals going to and from the camera 128 may pass through an image/video processor 44 that encodes and decodes the various image frames. A separate audio processor 46 may also be present controlling signals to and from the speakers 34 and the microphone 124. The graphical display interface 120 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth7 radio 39, which may incorporate an antenna on the chip or be coupled to an antenna off the chip. Throughout the apparatus are various memories such as random access memory RAM, which can include the system DRAM 14, read only memory ROM 45, and in some embodiments removable memory such as the illustrated memory card 20 on which various programs and data may be stored. All of these components within the UE 10 are normally powered by a portable power supply such as a battery 49.

The processors 38, 40, 42, 44, 46, 50, if embodied as separate entities in a UE 10, may operate in a slave relationship to the main processor (CPU) 12, which may then be in a master relationship to them. Certain embodiments may be disposed across various chips and memories as shown, or disposed within another processor that combines some of the functions described above for FIG. 9. Any or all of these various processors of FIG. 9 access one or more of the various memories, which may be on chip with the processor or separate from the chip with the processor. Note that the various integrated circuits (e.g., chips 38, 40, 42, etc.) that were described above may be combined into a fewer number than described and, in a most compact case, may all be embodied physically within a single chip.

In this exemplary embodiment the CPU 12 of the UE 10 (the host device) operates with the memory card 20 (the mass storage memory device) as described above with respect to FIGS. 5A, 5B and 5C so that the memory card 20 can be extended to use at least a portion of the system Dynamic RAM 14 of the UE 10 as described above.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms “connected,” “coupled,” or any variant thereof, mean any connection or coupling, either direct or indirect, between two or more elements, and may encompass the presence of one or more intermediate elements between two elements that are “connected” or “coupled” together. The coupling or connection between the elements can be physical, logical, or a combination thereof. As employed herein two elements may be considered to be “connected” or “coupled” together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A memory module comprising:

a non-volatile memory; and a memory module controller configured to:

manage storage of data into a portion of random access memory in a host device that is allocated to the memory module;

initiate, by the memory module controller and in response to a command or an attribute of a command received from the host device indicating that the portion of the random access memory in the host device is to be made unavailable, storing of a data subset, the data subset corresponding to at least some of the data from the portion of the random access memory in the host device; and update a setting of the memory module to indicate that the portion of the random access memory of the host is disabled, wherein the setting is updated at least partially in response to the command or the attribute of the command received from the host device indicating that the portion of the random access memory of the host is to be made unavailable.

2. The memory module as recited in claim 1, wherein the unavailability of the portion of the random access memory in the host device is based at least in part on a denial of access to the portion of the random access memory by the memory module.

3. The memory module as recited in claim 1, wherein the memory module controller is further configured to:

retrieve, based at least on the command or the attribute of the command received from the host device indicating that the portion of the random access memory in the host device is to be made unavailable, the data subset from the portion of the random access memory in the host device; and store the data subset in the non-volatile memory of the memory module.

4. The memory module as recited in claim 3, wherein the memory module controller is further configured to determine that the data subset is in use by the memory module controller, the retrieving of the data subset being based at least in part on the determining that the data subset is in use by the memory module controller.

5. The memory module as recited in claim 1, wherein the memory module controller is further configured to receive the command or the attribute of the command from the host device indicating that the portion of the random access memory in the host device is to be made unavailable.

6. The memory module as recited in claim 1, wherein the data subset comprises operational state data.

7. The memory module as recited in claim 1, wherein the memory module controller is further configured to receive, in association with a wake up from a shut down or sleep state of the memory module, another command or another attribute of another command from the host device indicating whether the memory module controller is permitted to initialize from the portion of the random access memory of the host device that is allocated to the memory module.

8. A method comprising:

managing, by a memory module controller of a memory module, storage of data into a portion of random access memory in a host device that is allocated to the memory module;

initiating, by the memory module controller in response to a command or an attribute of a command received from the host device indicating that the portion of the random access memory in the host device is to be made unavailable, storing of a data subset, the data subset corresponding to at least some of the data from the portion of the random access memory in the host device; and updating a setting of the memory module to indicate that the portion of the random access memory of the host is disabled, wherein the setting is updated at least partially in response to the command or the attribute of the command received from the host device indicating that the portion of the random access memory of the host is to be made unavailable.

9. The method as recited in claim 8, wherein the unavailability of the portion of the random access memory in the host device is based at least in part on a denial of access to the portion of the random access memory by the memory module.

10. The method as recited in claim 8, further comprising:
retrieving, based at least on the command or the attribute of the command received from the host device indicating that the portion of the random access memory in the host device is to be made unavailable, the data subset from the portion of the random access memory in the host device; and
storing the data subset in a non-volatile memory of the memory module.

11. The method as recited in claim 10, further comprising determining that the data subset is in use by the memory module controller, the retrieving of the data subset being based at least in part on the determining that the data subset is in use by the memory module controller.

12. The method as recited in claim 8, further comprising receiving the command or the attribute of the command from the host device indicating that the portion of the random access memory in the host device is to be made unavailable.

13. The method as recited in claim 8, wherein the data subset comprises operational state data.

14. The method as recited in claim 8, further comprising receiving, in association with a wake up from a shut down or sleep state of the memory module, another command or another attribute of another command from the host device indicating whether the memory module controller is permitted to initialize from the portion of the random access memory of the host device that is allocated to the memory module.

15. A host device comprising:
one or more processors; and
random access memory storing instructions that, when executed by the one or more processors, configure the host device to:
allocate a portion of the random access memory to a non-volatile memory module, the portion of the random access memory storing data available for use by the non-volatile memory module;
send, to the non-volatile memory module, a command or an attribute of a command indicating that the portion of the random access memory is to be made unavailable, wherein the command or the attribute of the command is configured to define a setting of the non-volatile memory module to indicate that the portion of the random access memory is disabled;
receive, from the non-volatile memory module and at least partially in response to the command or the attribute of the command indicating that the portion of the random access memory is to be made unavailable, a retrieval request for at least a subset of the data stored in the portion of the random access memory; and
send, to the non-volatile memory module and in response to the retrieval request, the subset of the data.

16. The host device as recited in claim 15, wherein the unavailability of the portion of the random access memory is based at least in part on a denial of access to the portion of the random access memory by the non-volatile memory module.

17. The host device as recited in claim 15, wherein the instructions further configure the host device to send, to the non-volatile memory module, another command or another attribute of another command indicating whether the non-volatile memory module is permitted to initialize from the portion of the random access memory that is allocated to the non-volatile memory module.

18. The host device as recited in claim 15, wherein the subset of the data is sent to the non-volatile memory module prior to the portion of the random access memory being made unavailable.

19. The memory module as recited in claim 1, wherein the memory module controller is further configured to update the setting to indicate that the portion of the random access memory of the host device is disabled following a completion of the storing of the data sub set.

20. The method as recited in claim 8, further comprising updating the setting of the memory module to indicate that the portion of the random access memory of the host device is disabled following a completion of the storing of the data subset.

21. The host device as recited in claim 15, wherein the command or the attribute of the command is configured to define the setting of the non-volatile memory module to indicate that the portion of the random access memory is disabled after the subset of the data is sent to the non-volatile memory module.

* * * * *